(12) United States Patent
Moinet et al.

(10) Patent No.: US 7,853,266 B2
(45) Date of Patent: Dec. 14, 2010

(54) METHOD AND DEVICE FOR MANAGEMENT OF AN OVERLOAD IN A CELL OF A RADIO COMMUNICATION NETWORK, CORRESPONDING USES, COMPUTER PROGRAM AND STORAGE MEANS

(75) Inventors: Grégoire Moinet, Choisy le Roi (FR); Patrick Blanc, Issy les Moulineaux (FR)

(73) Assignee: Alcatel Lucent, Paris (FR)

( * ) Notice: Subject to any disclaimer, the term of this patent is extended or adjusted under 35 U.S.C. 154(b) by 1042 days.

(21) Appl. No.: 11/567,702

(22) Filed: Dec. 6, 2006

(65) Prior Publication Data
US 2007/0135113 A1    Jun. 14, 2007

(30) Foreign Application Priority Data
Dec. 8, 2005    (FR)    .................... 05 53778

(51) Int. Cl.
*H04W 72/00* (2009.01)
(52) U.S. Cl. .................... 455/453; 455/422.1; 455/450; 455/418; 370/338
(58) Field of Classification Search .................. 455/453, 455/450, 422.1, 456.1–456.6, 445, 426.1, 455/446; 370/338, 112.2, 112.02, 112.06
See application file for complete search history.

(56) References Cited

U.S. PATENT DOCUMENTS 7,058,398 B2* 6/2006 Livet et al. ............... 455/422.1

2002/0052206 A1* 5/2002 Longoni ..................... 455/453
2004/0132441 A1 7/2004 Livet
2005/0233753 A1* 10/2005 Hamabe et al. .......... 455/452.1

OTHER PUBLICATIONS

L. Virtej et al, "Radio resource control for GSM/EDGE radio access network (GERAN)—inter radio access technology and inter-mode procedures" VTC Fall 2001. IEEE 54th Vehicular Technology Conference, Proceedings. Atlantic City, NJ, Oct. 7-11, 2001, IEEE, vol. 1 of 4, Conf. 54, Oct. 7, 2001, pp. 1417-1421, XP010562195.

* cited by examiner

*Primary Examiner*—Melur Ramakrishnaiah
(74) *Attorney, Agent, or Firm*—Fay Sharpe LLP

(57) ABSTRACT

The invention concerns a method of managing an overload in a cell of a cellular radio communication network comprising a plurality of user equipments (UE) each of which can switch between a plurality of states including a Cell_DCH state and a Cell_FACH state. According to the invention, this kind of method comprises the following steps, for each request (RAB request) for allocation of radio resources to a given user equipment in an initial state, before sending said request, in which initial state no radio resource is allocated to said user equipment:
  obtaining for said cell a current rate of successful transitions for the change from the Cell_FACH state to the Cell_DCH state;
  detecting an overload of the Cell_FACH state by analyzing said current rate of successful transitions;
  if an overload is detected, rejecting said request;
  if no overload is detected, accepting said request and switching said user equipment from said initial state to a final state in which at least one radio resource is allocated to said user equipment.

14 Claims, 3 Drawing Sheets

FIG_1
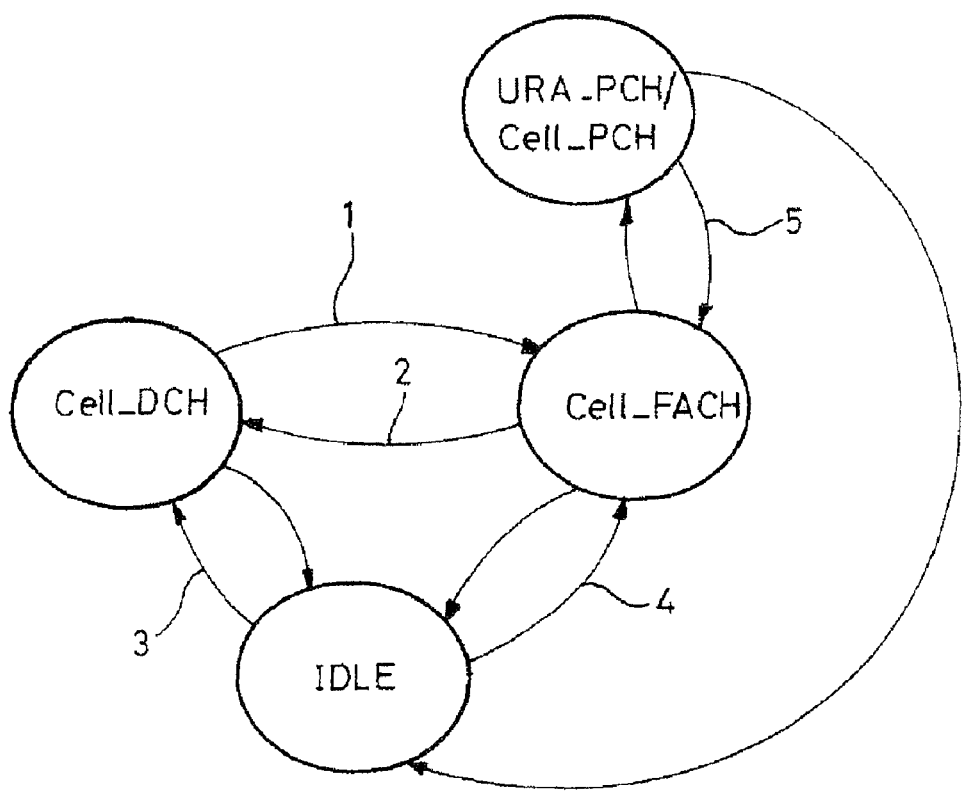
FIG_2
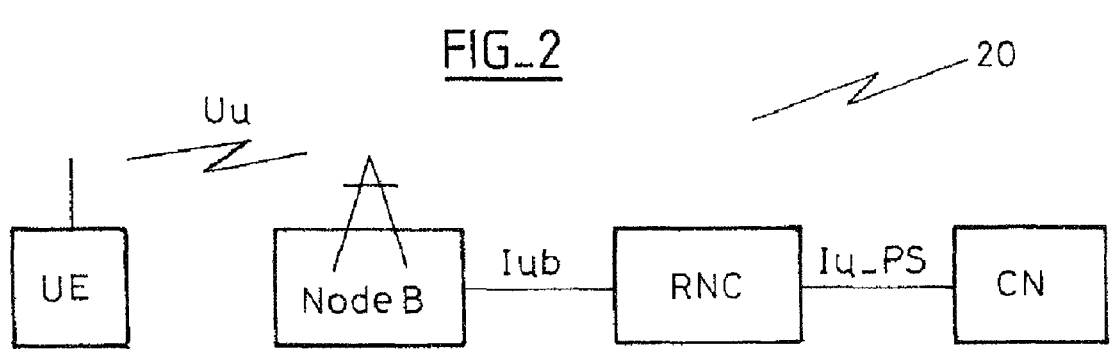

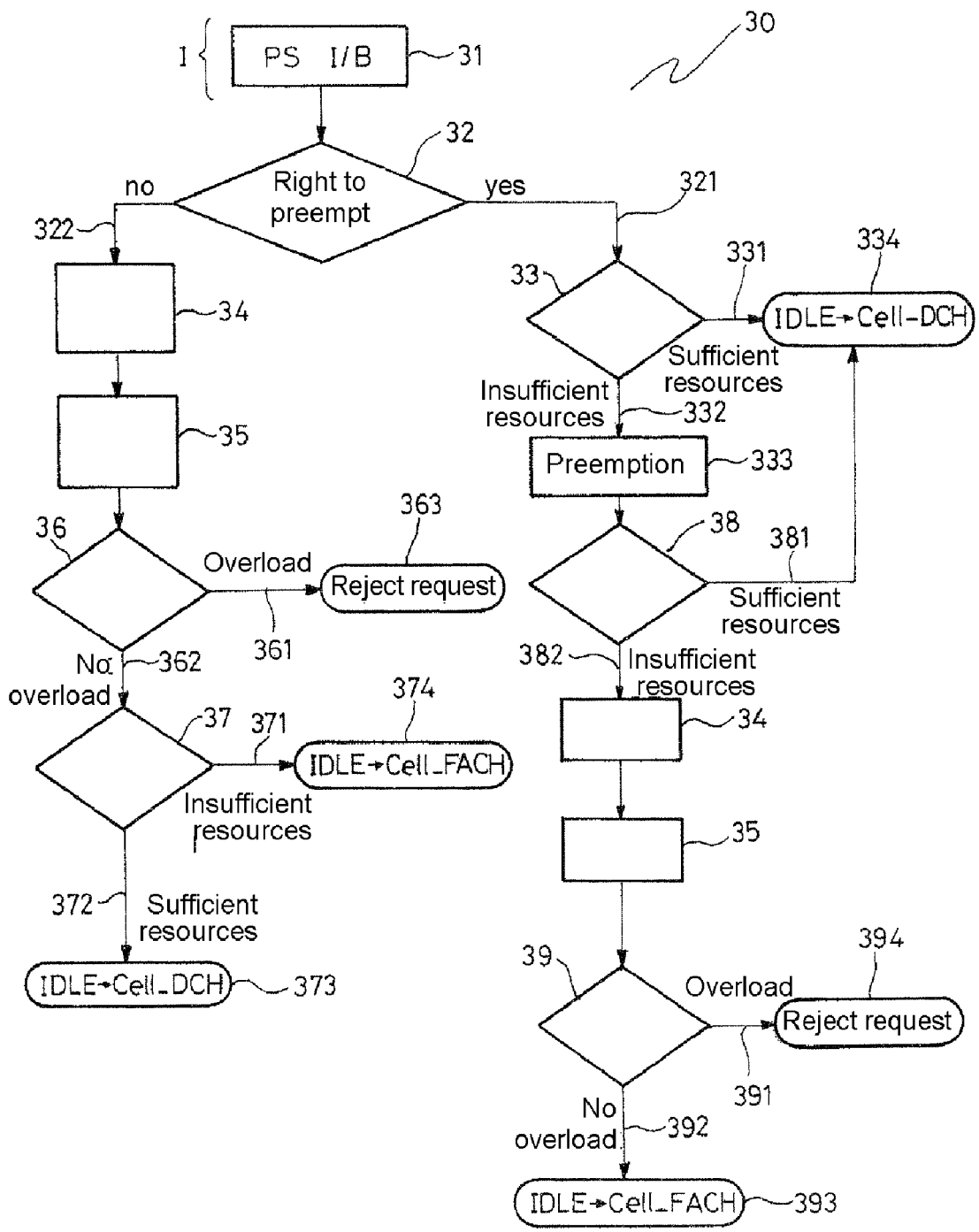

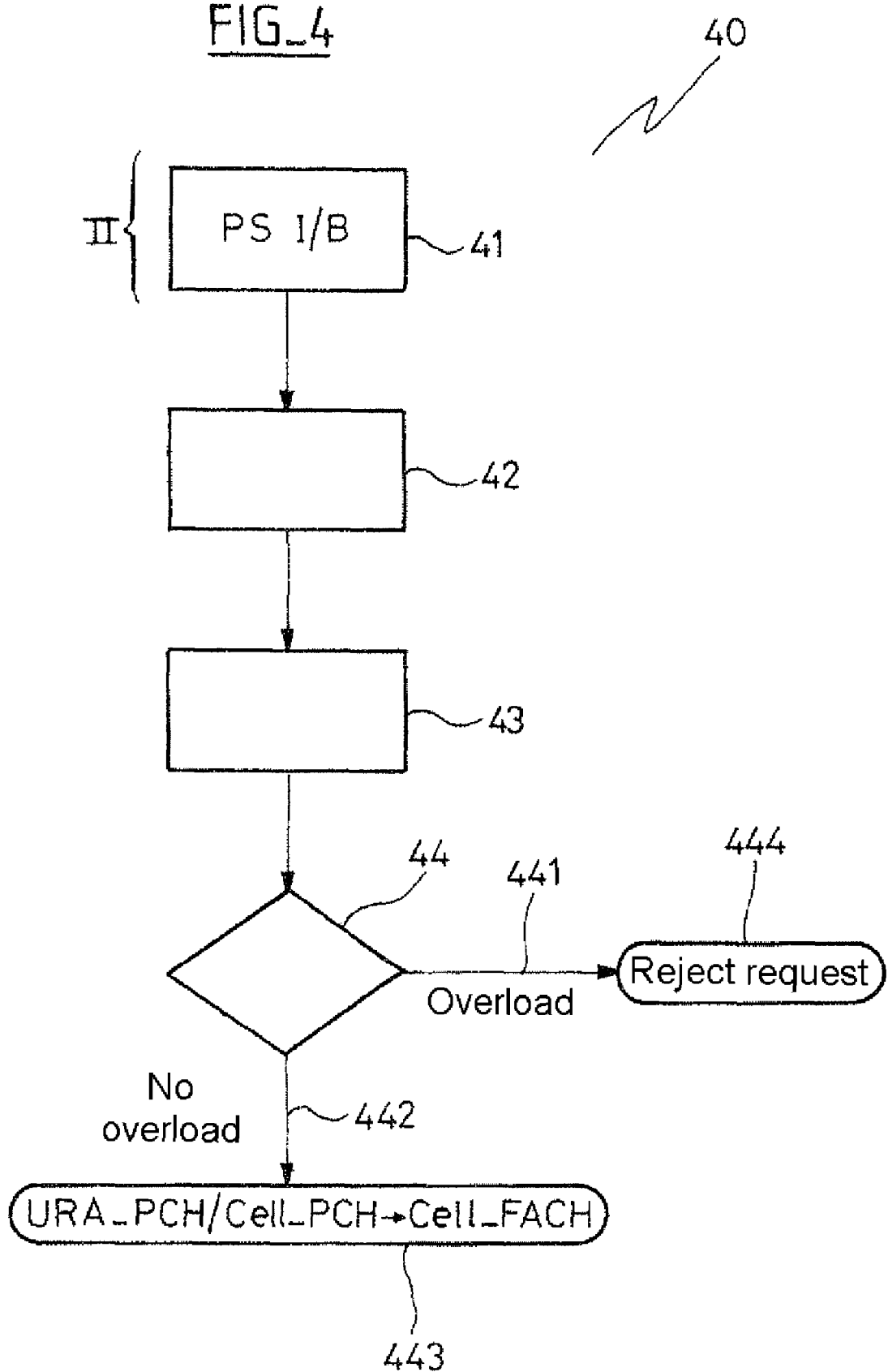

METHOD AND DEVICE FOR MANAGEMENT OF AN OVERLOAD IN A CELL OF A RADIO COMMUNICATION NETWORK, CORRESPONDING USES, COMPUTER PROGRAM AND STORAGE MEANS

CROSS-REFERENCE TO RELATED APPLICATIONS

This application is based on French Patent Application No. FR 0553778 filed on Dec. 8, 2005, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of communication networks. More precisely, the invention concerns 3rd generation mobile networks (also called 3G networks) such as in particular, although not exclusively, GSM/GPRS (Global System for Mobile communications/General Packet Radio Service), UMTS WCDMA (Universal Mobile Telecommunications Service Wideband Code-Division Multiple Access), UMTS TS-CDMA (Universal Mobile Telecommunications Service Time Slot Code-Division Multiple Access), etc. networks.

Even more precisely, the invention concerns a "load management" technique for facilitating the switching of a plurality of user equipments (3G mobile telephones, personal digital assistants (PDA), etc.) between a plurality of service states implemented in such networks.

The invention finds applications in particular in the management of overloading of a cell.

2. Description of the Prior Art

The 3GPP (3rd Generation Partnership Project) standard defines a plurality of service states of a user equipment.

As shown in FIG. 1, a user equipment (UE) can switch between four states:

- a first or IDLE state in which the user equipment is not allocated any context and/or radio resources in the radio access network;
- a second or Cell_DCH state in which the user equipment is allocated dedicated radio resources (a Dedicated Channel (DCH)) for real time transfer of large quantities of data in the context of a circuit call or a packet call;
- a third or Cell_FACH state in which the user equipment is allocated common radio resources (a Forward Access Channel (FACH)), in other words in which the user equipment is not allocated its own radio resources, for transferring small quantities of data with no real time constraints in the context of a packet call only; and
- a fourth or UR_PCH/CELL_PCH state in which the user equipment is not allocated any radio resource but retains a context, for example an international mobile subscriber identity (IMSI), in the radio network controller (RNC); the URA_PCH (UTRAN Registration Area Paging Channel) saves power (by releasing resources) and localizes the user equipment to the level of the nearest cell "URA" group.

As a general rule, a user equipment enters the Cell_FACH state in three situations:

- a first situation corresponding to the end of a period of activity: the user equipment has little data or no more data to transmit;
- a second situation corresponding to a lack of radio resources in the Cell_DCH state: the user equipment has to wait in the Cell_FACH state until radio resources can be dedicated to it; and
- a third situation corresponding to cell reselection: the user equipment in a given cell remains in the Cell_FACH state when it enters another cell.

The drawbacks of the prior art are discussed hereinafter in the particular situation of access to a packet switched (PS) service by a user equipment.

In the context of access to packet services, if a user equipment has no or little data to transmit, it switches from the Cell_DCH state to the Cell_FACH state (arrow 1 in FIG. 1). In the Cell_FACH state the user equipment receives and transmits data on a secondary common control physical channel (SCCPCH), for which no radio resource is reserved per user equipment.

Reciprocally, if the user equipment has new data to transmit, it switches from the Cell_FACH state to the Cell_DCH state (arrow 2 in FIG. 1).

It is important to note that the user equipment changing to the Cell_DCH state is conditioned by the verification of an admission control algorithm, for example of the RAC (Radio Admission Control) type, consisting in determining if sufficient radio resources (in terms of power) are available for the user equipment.

Most existing RAC algorithms are "strict" in the sense that they allow only a very small number of user equipments of the same cell to be in the Cell_DCH state. For example, for a packet service at 64 kbps on the uplink channel and 384 kbps on the downlink channel, only three to seven user equipments per cell in the Cell_DCH state are allowed.

The inventors have found that these admission algorithms can be unsuitable in certain situations.

In fact, they may lead to overloading of the Cell_FACH state in a given cell because, for a "go transition" (1), a large number of user equipments is allowed to change from the Cell_DCH state to the Cell_FACH state (typically in the situation of consulting web pages, in which the user equipments use packet services with a non-continuous traffic model), whereas for a "return transition" (2) only a limited number of user equipments is allowed to return from the Cell_FACH state to the Cell_DCH state. Thus the drawback of these algorithms is that they cause the user equipments to remain longer in the Cell_FACH state with a very low bit rate and a very low quality of service (QoS), reflected in longer loading times for new web pages, for example.

At present the 3GPP standard does not define any "load management" or quality of service management technique for the Cell_FACH state.

However, a well known technique for facilitating the passage (2) of a user equipment from the Cell_FACH state to the Cell_DCH state is based on limiting the number of user equipments in the Cell_FACH state. The advantage of this solution is that it avoids overloading the Cell_FACH state.

However, this known technique is not adapted to the situation of overloading the Cell_DCH state. In fact, if a plurality of user equipments in the same cell became very active in the packet service (PS) packet domain (i.e. in the case of downloading and/or consulting web pages (web browsing)), then a limited number of those user equipments would change to the Cell_FACH state and a large number of them would remain locked in the Cell_DCH state, in which they would consume dedicated radio resources unnecessarily and would prevent user equipments in the IDLE state changing to the Cell_DCH state.

Another major drawback of this solution is that it cannot be adapted dynamically to the traffic situation and is therefore not the optimum for 3G networks given that those networks generally have variable traffic models.

There is therefore a requirement for optimization of load control in a cell of a 3G network, in particular to facilitate the switching of one or more user equipments between the various service states cited above.

OBJECTIVES OF THE INVENTION

One objective of the invention is to alleviate these drawbacks of the prior art. More precisely, one objective of the invention is to provide an overload management technique that is simple to implement and efficient, in particular in terms of the speed of transition from the Cell_FACH state to the Cell_DCH state, i.e. that minimizes the waiting time in the Cell_FACH state.

Another objective of the invention is to provide a technique of this kind which, in one particular embodiment, facilitates the equipment changing from the Cell_DCH state to the Cell_FACH state.

A further objective of the invention, in at least one embodiment, is to propose a technique of this kind that reduces the waiting time of a user equipment for the change from the IDLE state to the Cell_FACH state or the Cell_DCH state.

A further objective of the invention, in at least one embodiment, is to propose a technique of this kind that reduces the waiting time of a user equipment for the change from the URA_PCH/CELL_PCH state to the Cell_FACH state.

A further objective of the invention, in at least one embodiment, is to provide a technique of this kind that eliminates, or at least limits, the risk of call drops (interruption of calls in progress).

A further objective of the invention, in one particular embodiment, is to provide a technique of this kind which is particularly well adapted to all existing 3G networks.

A further objective of the invention, in one particular embodiment, is to provide a technique of this kind which does not lead to costly or complex modification of existing mobile stations.

SUMMARY OF THE INVENTION

The above objectives, together with others that will become apparent hereinafter, are achieved by a method of managing an overload in a cell of a cellular radio communication network comprising a plurality of user equipments each of which can switch between a plurality of states including a Cell_DCH state and a Cell_FACH state. According to the invention, this kind of method comprises the following steps, for each request (RAB request) for allocation of radio resources to a given user equipment in an initial state, before sending said request, in which initial state no radio resource is allocated to said user equipment:
  obtaining for said cell a current rate of successful transitions for the change from the Cell_FACH state to the Cell_DCH state;
  detecting an overload of the Cell_FACH state by analyzing said current rate of successful transitions;
  if an overload is detected, rejecting said request;
  if no overload is detected, accepting said request and switching said user equipment from said initial state to a final state in which at least one radio resource is allocated to said user equipment.

Thus the invention is based on an entirely novel and inventive approach to load management in a cell of a radio communication network. In fact, the invention relies on the calculation of a current rate of successful transitions for the change from the Cell_FACH state to the Cell_DCH state, which therefore imposes no fixed restriction on the number of user equipments in the Cell_FACH state.

Furthermore, the invention proposes to automate some or all of the allocation of the radio resources of a cell using Cell_FACH state overload information obtained by processing the current rate of successful transitions.

Note that, to avoid preventing the releasing of dedicated radio resources, it is advantageous not to refuse a change of user equipment from the Cell_DCH state to the Cell_FACH state.

Advantageously, said initial state is an IDLE state and said acceptance step comprises the following steps:
  detecting that a sufficient quantity of dedicated radio resources can be allocated to said user equipment;
  if a sufficient quantity of radio resources is detected, switching said user equipment from said IDLE state to said Cell_DCH state;
  if not, switching said user equipment from said IDLE state to said Cell_FACH state.

Said initial state is preferably a URA_PCH/CELL_PCH state and said final state is preferably the Cell_FACH state.

Said step of obtaining for said cell a current rate of successful transitions for the change from the Cell_FACH state to the Cell_DCH state advantageously comprises the following steps:
  determining an immediate success rate RiT equal to the ratio between a number of successful transitions and a number of transitions attempted during a current period T;
  determining said current rate RT of successful transitions as a function of said immediate success rate RiT and a preceding rate RT−1 of successful transitions obtained at the end of a preceding period T−1.

Preferably:

$$RT = \alpha \cdot RiT + (1-\alpha) \cdot RT{-}1$$

with $\alpha \in [0; 1]$.

Note that this mathematical formula is generally called the forget factor filter equation.

Said step of detecting an overload of the Cell_FACH state advantageously comprises the following steps:
  comparing said current rate of successful transitions to a particular threshold;
  if said current rate is below said particular threshold, deeming an overload to have been detected;
  if not, deeming no overload to have been detected.

It is therefore possible for a network operator to adjust the value of the threshold to optimize the compromise between quality of service (in terms of reactivity) and the network load.

In one advantageous embodiment of the invention said method further comprises the following steps:
  a first detection of a preemption capacity associated with said user equipment;
  in the event of a positive first detection, a second detection of a sufficient quantity of dedicated radio resources that can be allocated to said user equipment;
  if a sufficient quantity of radio resources is detected, switching said user equipment from said IDLE state to said Cell_DCH state;
  if not, preempting radio resources for said user equipment.

Said method advantageously further comprises the following steps if radio resources are preempted:

a third detection of a sufficient quantity of dedicated radio resources that can be allocated to said user equipment;

if a sufficient quantity of radio resources is detected, switching said user equipment from said IDLE state to said Cell_DCH state;

if not:

obtaining for said cell a current rate of successful transitions for the change from the Cell_FACH state to the Cell_DCH state;

detecting an overload of the Cell_FACH state by analyzing said current rate of successful transitions;

if an overload is detected, rejecting said request;

if no overload is detected, accepting said request and switching said user equipment from said IDLE state to said Cell_FACH state.

The invention also concerns the use of the above method in the situation where each user equipment, when it is in the Cell_DCH state, uses a dedicated channel DTCH.

The invention also concerns the use of the above method in the situation where each user equipment, when it is in the Cell_DCH state, uses a dedicated channel HS-DSCH.

The invention further concerns a device for management of overloads in a cell of a cellular radio communication network comprising a plurality of user equipments each of which can switch between a plurality of states including a Cell_DCH state and a Cell_FACH state. According to the invention, a device of this kind comprises:

means for receiving a request (RAB request) for allocation of radio resources to a given user equipment in an initial state, before sending said request, in which initial state no radio resource is allocated to said user equipment;

means for obtaining for said cell a current rate of successful transitions for the change from the Cell_FACH state to the Cell_DCH state;

means for detecting an overload of the Cell_FACH state by analyzing said current rate of successful transitions;

means for processing said request and means for switching said user equipment from said initial state to a final state in which at least one radio resource is allocated to said user equipment if no overload is detected.

More generally, the device of the invention comprises means for implementing any of the embodiments described above of the overload management method.

The device cited above is preferably included in a radio network controller.

The invention further concerns a computer program comprising program code instructions for the execution of the steps of the above method when said program is executed in or by a microprocessor.

The invention further concerns storage means, possibly fully or partly removable, readable by a computer, storing a set of instructions that can be executed by said computer to implement the above method.

Other features and advantages of the invention will become more clearly apparent on reading the following description of one preferred embodiment, given by way of illustrative and nonlimiting example only, and from the appended drawings.

BRIEF DESCRIPTION OF THE DRAWINGS

FIG. 1, already commented on in relation to the prior art, shows the four service states of a user equipment conforming to the 3GPP standard.

FIG. 2 is a simplified diagram of a packet service access system according to one particular embodiment of the invention.

FIG. 3 is a flowchart of one particular embodiment of the management method of the invention in the case of a user equipment starting from an IDLE initial state.

FIG. 4 is a flowchart of one particular embodiment of the management method of the invention in the case of a user equipment starting from an URA_PCH/CELL_PCH initial state.

DETAILED DESCRIPTION OF THE PREFERRED EMBODIMENTS

FIG. 2 is a diagram of one particular embodiment of a packet service access system 20 according to the invention for implementing one particular embodiment of the invention of the overload management method according to the invention.

It is assumed that a user equipment UE in a given cell (not shown) requires to access one or more 3GPP packet services offered via a core network CN connected to a radio network controller RNC.

In the conventional way, the user equipment UE is connected via an interface Uu to a base station, which is called a Node B in 3G networks or a base transceiver station (BTS) in GSM networks. The base station Node B is connected to the radio network controller RNC via an interface Iub. The radio network controller RNC is connected to the core network CN via an interface Iu-Ps.

Throughout the remainder of this document, the expression "establishing an RAB" (Radio Access Bearer) refers to a complete procedure comprising:

not only establishing an RAB as such (i.e. establishing a dedicated transport channel (DTCH) or a high speed downlink shared channel (HS-DCH));

but also establishing beforehand a radio resource control (RRC) connection.

Likewise, the expression "RAB request" (or radio resource allocation request) refers to a request transmitted from the core network CN to the radio network controller RNC to establish an RAB in the above sense (i.e. in the sense of the aforementioned complete procedure).

This kind of RAB request is handled by the radio network controller RNC.

In one particular embodiment of the invention, the processing of this RAB request relies on the detection of an overload in the given cell by analyzing a current rate of successful transitions. The processing of the RAB request is described in detail hereinafter with reference to FIGS. 3 and 4, corresponding to two different starting states of the user equipment UE (also referred to hereinafter as initial states).

There is described next, with reference to FIG. 3, the successive chaining of the various steps of the method 30 according to the invention for a first embodiment in which a user equipment in a given cell is in an IDLE state before sending the RAB request.

An identification phase 1 comprises a first step 31 during which the radio network controller RNC determines the class of service of the RAB request, with the result that, in the case of an interactive/background PS service, the next step is a step 32; on the other hand, if the service is not an interactive/background PS service, the standard call set-up procedure is executed, i.e. the mechanism according to the invention of detecting an overload in a cell, as described hereinafter, is not involved.

During the step 32, the radio network controller RNC verifies the rights associated with the user equipment UE. If a preemption capacity associated with the user equipment UE is detected (321), the next step is a step 33; if not (322), the next step is a step 34.

During the step 34, an immediate success rate RiT is determined, being equal to the ratio between a number of successful transitions and a number of transitions attempted during a current period T.

Then, during the step 35, a current rate RT of successful transitions is calculated as a function of the immediate success rate RiT obtained in the step 34 and a previous rate RT−1 of successful transitions, obtained at the end of a preceding period T−1.

In one particular embodiment of the invention, the current rate RT of successful transitions is obtained from the following equation:

$$RT = \alpha \cdot RiT + (1-\alpha) \cdot RT-1$$

where $\alpha \in [0; 1]$.

During the step 26, the current rate RT of successful transitions obtained in the step 35 is compared to a particular threshold, with the result that, if the current rate RT is below the particular threshold, an overload is deemed to have been detected (361); if not, no overload is deemed to have been detected (362) and the next step is a step 37.

Remember that if an overload is detected (361), the request is rejected (363), which leads to the user equipment UE remaining in the IDLE state.

Finally, during the step 37, the radio network controller RNC executes an algorithm (for example an algorithm of the RAC, CAC, CEAC, etc. type) for detecting if a sufficient quantity of dedicated interface radio resources and bandwidth can be allocated to the user equipment UE. In the case of a positive outcome (372) (sufficient dedicated interface radio resources and bandwidth), the user equipment UE switches from the IDLE state to the Cell_DCH state (373—arrow 3 in FIG. 1); if not (371), the user equipment UE switches from the IDLE state to the Cell_FACH state (374—arrow 4 in FIG. 1).

There is described hereinafter the successive chaining of the various steps of the method 30 according to the invention when a preemption capacity associated with the user equipment UE is detected in the above step 32.

During the step 33 (which is identical to the step 37), the radio network controller RNC executes an algorithm (for example an algorithm of the RAC, CAC, CEAC, etc. type) for detecting if a sufficient quantity of dedicated radio resources can be allocated to the user equipment UE. In the event of a positive outcome (331) (sufficient dedicated radio resources), the user equipment UE (see FIG. 1) switches 3 from the IDLE state to the Cell_DCH state (334); if not (332), radio resources are preempted for the user equipment UE (333), after which the next step is a step 38.

During the step 38 (which is identical to the step 37), the radio network controller RNC executes an algorithm (for example an algorithm of RAC, CAC, CEAC, etc. type) for detecting if a sufficient quantity of dedicated radio resources may be allocated to the user equipment UE. In the event of a positive outcome (381) (sufficient dedicated radio resources), the user equipment UE (see FIG. 1) switches (3) from the IDLE state to the Cell_DCH state (334); if not (382), the steps 34 and 35 cited above are executed in succession and the next step is a step 39.

Finally, during the step 39, the current rate RT of successful transitions obtained in the step 35 is compared to a particular threshold, so that if the current rate RT is below the particular threshold, an overload is deemed to have been detected (391); if not (392), the user equipment UE (see FIG. 1) switches (4) from the IDLE state to the Cell_FACH state (393).

Remember that if an overload is detected (391), the request is rejected (394), which leads to the user equipment UE remaining in the IDLE state.

There is described next, with reference to FIG. 4, the successive chaining of the various steps of a second embodiment of the method 40 according to the invention in which a user equipment in a given cell is in a URA_PCH/CELL_PCH state before sending the RAB request.

An identification phase 11 comprises a first step 41 during which the radio network controller RNC determines the class of service of the RAB request so that in the presence of "interactive" or "background" classes of service the next step is a step 42; on the other hand, in the presence of another type of class of service (for example "streaming") the request is rejected, i.e. the user equipment remains in the URA_PCH/CELL_PCH state.

During the step 42 (which is identical to the step 34), there is determined an immediate success rate RiT equal to the ratio between the number of successful transitions and a number of transitions attempted during a current period T.

Then, during the step 43 (which is identical to the step 35) a current rate RT of successful transitions is calculated as a function of the immediate success rate RiT obtained in the step 42 and a preceding rate RT−1 of successful transitions obtained at the end of a preceding period T−1.

Finally, during the step 44, the current rate RT of successful transitions obtained in the step 43 is compared to a particular threshold, and if the current rate RT is below the particular threshold, an overload is deemed to have been detected (441); if not (442), the user equipment UE switches from the URA_PCH/CELL_PCH state to the Cell_FACH state (443—arrow 5 in FIG. 1).

Remember that if an overload is detected (441), the request is rejected (444), which causes the user equipment UE to remain in the URA_PCH/CELL_PCH state.

The technique of the invention has numerous advantages, a non-exhaustive list whereof follows:

the change from the Cell_FACH state to the Cell_DCH state is improved. In fact, the invention enables a user equipment not to be blocked in the Cell_FACH state and to exit that state rapidly, without having to return via the IDLE state.

network load management ergonomics are improved. In fact, the invention is based on the detection of an overload of the Cell_FACH state. This overload information adapts automatically to network evolution (variation of the number of user equipments on the network, evolution of traffic models, etc.).

The invention applies in particular, although not exclusively, to the situation where:

each user equipment, when it is in the Cell_DCH state, uses a dedicated channel DTCH;

each user equipment, when it is in the Cell_DCH state, uses a dedicated channel HS_DSCH.

There is claimed:

1. A method of managing an overload in a cell of a cellular radio communication network comprising a plurality of user equipments each of which can switch between a plurality of states including a Cell_DCH state and a Cell_FACH state, which method comprises the following steps, for each request (RAB request) for allocation of radio resources to a given user equipment in an initial state, before sending said request, in which initial state no radio resource is allocated to said user equipment:

obtaining for said cell a current rate of successful transitions for the change from the Cell_FACH state to the Cell_DCH state;

detecting an overload of the Cell_FACH state by analyzing said current rate of successful transitions;

if an overload is detected, rejecting said request;

if no overload is detected, accepting said request and switching said user equipment from said initial state to a final state in which at least one radio resource is allocated to said user equipment.

2. A method according to claim 1, wherein said initial state is an IDLE state and said acceptance step comprises the following steps:

detecting that a sufficient quantity of dedicated radio resources can be allocated to said user equipment;

if a sufficient quantity of radio resources is detected, switching said user equipment from said IDLE state to said Cell_DCH state;

if not, switching said user equipment from said IDLE state to said Cell_FACH state.

3. A method according to claim 1, wherein said initial state is a URA_PCH/CELL_PCH state and in that said final state is the Cell_FACH state.

4. A method according to claim 1, wherein said step of obtaining for said cell a current rate of successful transitions for the change from the Cell_FACH state to the Cell_DCH state comprises the following steps:

determining an immediate success rate RiT equal to the ratio between a number of successful transitions and a number of transitions attempted during a current period T;

determining said current rate RT of successful transitions as a function of said immediate success rate RiT and a preceding rate RT−1 of successful transitions obtained at the end of a preceding period T−1.

5. A method according to claim 4, wherein:

$RT = \alpha \cdot RiT + (1-\alpha) \cdot RT-1$ with $\alpha \in [0; 1]$.

6. A method according to claim 1, wherein said step of detecting an overload of the Cell_FACH state comprises the following steps:

comparing said current rate of successful transitions to a particular threshold;

if said current rate is below said particular threshold, deeming an overload to have been detected;

if not, deeming no overload to have been detected.

7. A method according to claim 2, further comprising the following steps:

a first detection of a preemption capacity associated with said user equipment;

in the event of a positive first detection, a second detection of a sufficient quantity of dedicated radio resources that can be allocated to said user equipment;

if a sufficient quantity of radio resources is detected, switching said user equipment from said IDLE state to said Cell_DCH state;

if not, preempting radio resources for said user equipment.

8. A method according to claim 7, further comprising the following steps if radio resources are preempted:

a third detection of a sufficient quantity of dedicated radio resources that can be allocated to said user equipment;

if a sufficient quantity of radio resources is detected, switching said user equipment from said IDLE state to said Cell_DCH state;

if not:

obtaining for said cell a current rate of successful transitions for the change from the Cell_FACH state to the Cell_DCH state;

detecting an overload of the Cell_FACH state by analyzing said current rate of successful transitions;

if an overload is detected, rejecting said request;

if no overload is detected, accepting said request and switching said user equipment from said IDLE state to said Cell_FACH state.

9. Use of an overload management method according to claim 1 in the situation where each user equipment, when it is in the Cell_DCH state, uses a dedicated channel DTCH.

10. Use of an overload management method according to claim 1 in the situation where each user equipment, when it is in the Cell_DCH state, uses a dedicated channel HS-DSCH.

11. Computer program comprising program code instructions for the execution of the steps of the method according to claim 1 when said program is executed in or by a microprocessor.

12. Storage means, possibly fully or partly removable, readable by a computer, storing a set of instructions that can be executed by said computer to implement the method according to claim 1.

13. A device for management of overloads in a cell of a cellular radio communication network comprising a plurality of user equipments each of which can switch between a plurality of states including a Cell_DCH state and a Cell_FACH state, which device comprises:

means for receiving a request (RAB request) for allocation of radio resources to a given user equipment in an initial state, before sending said request, in which initial state no radio resource is allocated to said user equipment;

means for obtaining for said cell a current rate of successful transitions for the change from the Cell_FACH state to the Cell_DCH state;

means for detecting an overload of the Cell_FACH state by analyzing said current rate of successful transitions;

means for processing said request and means for switching said user equipment from said initial state to a final state in which at least one radio resource is allocated to said user equipment if no overload is detected.

14. A device according to claim 13, included in a radio network controller.

* * * * *